United States Patent [19]
Denoize et al.

[11] Patent Number: 5,884,222
[45] Date of Patent: *Mar. 16, 1999

[54] COLLISION AVOIDANCE DEVICE FOR AIRCRAFT, ESPECIALLY FOR AVOIDING COLLISIONS WITH THE GROUND

[75] Inventors: Xavier Denoize; François Faivre, both of St Medard en Jalles, France

[73] Assignee: Sextant Avionique, Velizy Villacoublay, France

[*] Notice: The term of this patent shall not extend beyond the expiration date of Pat. No. 5,414,631.

[21] Appl. No.: 615,062

[22] Filed: Mar. 13, 1996

[30] Foreign Application Priority Data

Mar. 17, 1995 [FR] France ................................. 95 03138

[51] Int. Cl.$^6$ ...................................................... G01S 7/78
[52] U.S. Cl. ........................... 701/301; 340/970; 340/973
[58] Field of Search ..................... 701/4, 7, 8, 9, 701/207, 214, 300, 301, 120, 121, 122, 14, 15, 16; 340/961, 963, 970, 973, 903, 435, 436; 342/65, 357, 458, 461, 462; 244/180–181, 186

[56] References Cited

U.S. PATENT DOCUMENTS

| | | | |
|---|---|---|---|
| 4,144,571 | 3/1979 | Webber | 701/217 |
| 4,646,244 | 2/1987 | Bateman et al. | 701/301 |
| 4,760,396 | 7/1988 | Barney et al. | 342/65 |
| 4,924,401 | 5/1990 | Bice et al. | 701/6 |
| 5,142,480 | 8/1992 | Morrow | 701/29 |
| 5,311,272 | 5/1994 | Daniels et al. | 356/5.04 |
| 5,414,631 | 5/1995 | Denoize et al. | 701/301 |
| 5,488,563 | 1/1996 | Chazelle et al. | 701/301 |
| 5,575,438 | 11/1996 | McGonigle et al. | 244/13 |
| 5,608,392 | 3/1997 | Faivre et al. | 701/206 |
| 5,677,842 | 10/1997 | Denoize et al. | 701/301 |
| 5,689,444 | 11/1997 | Jordan et al. | 364/554 |

FOREIGN PATENT DOCUMENTS

| | | |
|---|---|---|
| 2 450 443 | 9/1980 | France . |
| 2 697 796 | 5/1994 | France . |

OTHER PUBLICATIONS

C. Hewitt, et al. "A Ground and Obstacle Collision Avoidance Technique (GOCAT)", *Proceedings of The IEEE 1991 National Aerospace and Electronics Conference NAECON 1991*, Dayton, Ohio, vol. 2, May 20–24, 1991, pp. 604–610.

Primary Examiner—Jacques H. Louis-Jacques
Assistant Examiner—Gertrude Arthur
Attorney, Agent, or Firm—Oblon, Spivak, McClelland, Maier & Neustadt, P.C.

[57] ABSTRACT

A collision avoidance device for an aircraft of the type comprises means for the geographical localization of the aircraft, means for the computation, for each geographical place, of a safety floor above which the aircraft must be positioned, means to predict the position in the air of the aircraft between a first given instant and a second given instant and means to compare the predicted position in the air of the aircraft with respect to the specified security floor. The safety floor, which is used for the comparison, is consolidated beforehand by means of a sensor that detects the obstacles in a forward sector of the aircraft and provides means with measurements enabling the computation of the altitude of these obstacles with respect to a reference level. The disclosed device has the advantage of enabling a reduction in the risk of delayed alarms and harmful alarms.

10 Claims, 4 Drawing Sheets

FIG. 4a (M1) — LONGITUDE / LATITUDE

| 10 | 10 | 10 | 15 | 15 | 15 | 15 | 15 | 15 | 15 | 10 | 10 |
|----|----|----|----|----|----|----|----|----|----|----|----|
| 10 | 10 | 10 | 15 | 15 | 15 | 15 | 15 | 15 | 15 | 10 | 10 |
| 10 | 10 | 10 | 15 | 15 | 15 | 15 | 15 | 15 | 15 | 10 | 10 |
| 10 | 10 | 10 | 15 | 15 | 15 | 15 | 15 | 15 | 15 | 10 | 10 |
| 12 | 12 | 12 | 12 | 15 | 15 | 15 | 15 | 15 | 15 | 10 | 10 |
| 12 | 12 | 12 | 12 | 15 | 15 | 15 | 15 | 15 | 15 | 10 | 10 |
| 12 | 12 | 12 | 12 | 15 | 15 | 15 | 15 | 15 | 15 | 10 | 10 |
| 10 | 10 | 10 | 15 | 15 | 15 | 15 | 15 | 15 | 15 | 10 | 10 |
| 10 | 10 | 10 | 15 | 15 | 15 | 15 | 15 | 15 | 15 | 10 | 10 |
| 10 | 10 | 10 | 15 | 15 | 15 | 15 | 15 | 15 | 15 | 10 | 10 |

FIG. 4b (M2) — LONGITUDE / LATITUDE

| 6 | 6 | 6 | 6 | 6 | 6 | 6 | 6 | 6 | 6 | 6 | 6 |
|----|----|----|----|----|----|----|----|----|----|----|----|
| 6 | 6 | 6 | 6 | 6 | 6 | 6 | 6 | 6 | 6 | 6 | 6 |
| 6 | 6 | 6 | 6 | 6 | 6 | 6 | 6 | 6 | 6 | 6 | 6 |
| 6 | 6 | 6 | 6 | 6 | 6 | 6 | 6 | 6 | 6 | 6 | 6 |
| 6 | 6 | 6 | 6 | 6 | 6 | 6 | 6 | 6 | 6 | 6 | 6 |
| 6 | 6 | 6 | 6 | 6 | 6 | 6 | 6 | 6 | 6 | 6 | 6 |
| 8 | 8 | 8 | 8 | 6 | 6 | 6 | 6 | 6 | 6 | 6 | 6 |
| 10 | 10 | 10 | 8 | 8 | 6 | 8 | 8 |  |  |  |  |
| 13 | 10 | 10 | 8 | 8 | 8 | 8 | 6 |  |  |  |  |
| 13 | 13 | 10 | 8 | 6 | 6 | 6 | 6 |  |  |  |  |

FIG. 4c (M3) — LONGITUDE / LATITUDE

| 10 | 10 | 10 | ✕ | 15 | 15 | 15 | 15 | 15 | ✕ | 10 | 10 |
|----|----|----|----|----|----|----|----|----|----|----|----|
| 10 | 10 | 10 | 12,5 | 15 | 15 | 15 | 15 | 15 | 12,5 | 10 | 10 |
| 10 | 10 | 10 | 12,5 | 15 | 15 | 15 | 15 | 15 | 12,5 | 10 | 10 |
| 10 | 10 | 10 | 12,25 | 15 | 15 | 15 | 15 | 15 | 12,5 | 10 | 10 |
| ✕ | 11 | 12,25 | 12,25 | 14,25 | 15 | 15 | 15 | 15 | 12,5 | 10 | 10 |
| 12 | 12 | 12 | 12 | 13,5 | 15 | 15 | 15 | 15 | 12,5 | 10 | 10 |
| ✕ | 11 | 12,25 | 12,25 | 14,25 | 15 | 15 | 15 | 15 | 12,5 | 10 | 10 |
| 10 | 10 | 10 | 11,75 | 15 | 15 | 15 | 15 | 15 | 12,5 | 10 | 10 |
| 13 | 10 | 10 | 12,5 | 15 | 15 | 15 | 15 | 15 | 12,5 | 10 | 10 |
| 13 | 13 | ✕ | 12,5 | 15 | 15 | 15 | 15 | 15 | ✕ | 10 | 10 |

COLLISION AVOIDANCE DEVICE FOR AIRCRAFT, ESPECIALLY FOR AVOIDING COLLISIONS WITH THE GROUND

BACKGROUND OF THE INVENTION

1. Field of the Invention

The present invention relates to a collision avoidance device, especially a device for avoiding collisions with the ground. It can be applied in particular to civilian airliners. More generally, it can be applied to all aircraft that, in the course of their mission, have to come excessively close to the ground, for example when they are near mountains, or that have to maneuver in sectors of air space where they constitute a danger or are themselves in danger, for example in areas to which access is prohibited.

2. Description of the Prior Art

Devices for avoiding collision between aircraft and the ground are known. These devices are characterized chiefly by the use of radio-altimeters, computers that give the barometric height on the basis of pressure and temperature measurements and navigation means such as an inertial guidance system or a flight management system. The principle of these devices lies in making use of an altimeter height, taken with respect to the ground, and in making use of variations in radio-altimeter height or barometric height. The latter is used in particular because, as compared with altimeter height variations, it is available for great heights. These distances from the ground are compared with threshold values that themselves depend on the values of heights and the configuration of the aircraft, depending on whether its undercarriage, flaps or slats are deployed for example. When the parameters measured, the heights and the variations of heights as a function of time in particular, exceed the threshold values, an alarm is sent to the crew. However, such devices have the drawback of giving measurements that are excessively delayed with respect to the maneuvering of the aircraft, and hence of generating alarms that are often excessively delayed and prevent the crews from reacting in time. It is therefore likely that such devices will not to prevent collision. This may happen in particular when the relief takes a sudden upward turn, for example when the aircraft moves towards the side of a sharply rising mountain. Another drawback of the known devices is that they generate unwarranted alarms which are also called false alarms. These may occur for example when the aircraft are flying over low-altitude mountains with a good safety height but when rising features of the relief for example, while being harmless, cause false alarms. These drawbacks seriously reduce the credibility of these anti-collision devices.

Improvements have been made to these devices, for example by introducing databases that enable the modulation of the value of the thresholds to be taken into account as a function of the geographical position of the aircraft. These improvements are likely to reduce the false alarms. However, they require databases adapted to each type of terrain. As an extension of this latter approach, it is possible to envisage the preparation of a digital field model that would provide permanent knowledge, depending on the position of the aircraft, of the nature of the relief ahead of this aircraft. Nevertheless, the use of such a model would require a database describing the relief in a sufficiently precise way, hence a database that requires large-sized memories. In addition to this drawback, there is the need for procedures of exchange and for updating a database of this type. This complicates its use. The large number of information elements stored furthermore entails non-negligible risks of error. The performance characteristics of these devices, especially in terms of harmful alarms, is related essentially to the resolution of the database. Indeed, the uncertainty of measurement as regards the position of the aircraft must be taken into account in the computation of the alarm in order to prevent any belated alarm. This leads to a possibility of harmful alarms.

The present Applicant, in the document FR 2.697.796, has already proposed a collision-avoidance device for an aircraft that mitigates the above-mentioned drawbacks, especially by getting rid of random factors of variation in relief and by determining the position of the aircraft no longer with respect to the ground but with respect to known safety altitudes.

This document describes a collision avoidance device for an aircraft comprising means of geographical localization, means for the computation, on the basis especially of each geographical location and of safety altitudes memorized in a database, of a safety floor above which the aircraft should be located, means for predicting the air position of the aircraft between a first given instant and a second given instant and means to compare the predicted air position of the aircraft with respect to the constructed floor.

During operation, an alarm is, for example, activated as soon as the result of the comparison indicates that a predicted air position of the aircraft is below the floor.

The present invention is an improvement on the above device, enabling an increase in the resolution of the information elements used in the computation of alarms, without however increasing the volume of the database. It also makes it possible to be no longer dependent on possible errors in the measurement of navigation and thus makes it possible to cancel the risk of a belated alarm.

SUMMARY OF THE INVENTION

More specifically, an object of the present invention is a collision avoidance device for an aircraft of the type comprising means for the geographical localization of the aircraft, means for the computation, for each geographical place, of a safety floor above which the aircraft must be positioned, means to predict the position in the air of the aircraft between a first given instant and a second given instant and means to compare the predicted air position of the aircraft with respect to the specified security floor, wherein the device comprises, in addition:

means giving an altitude of the aircraft as a function of a reference level;

a sensor to detect obstacles in a forward sector of the aircraft and to deliver measurements to means computing the altitude of these obstacles with respect to said reference level;

means to modify the safety floor specified as a function of the altitude of the detected obstacles.

Furthermore, the device described in the document FR 2.697.796 enables the computation of the floors which, for geographical localization, may show certain cases of discontinuity or breaks. In certain cases, the aircraft may have to go momentarily beneath the level of the floor without this being in any way dangerous. This produces an alarm that is harmful to the crew of the aircraft.

According to one variant of the collision avoidance device according to the invention, since the safety floor delivered by the computation means may have a value of discontinuity for a given geographical localization with respect to surrounding positions of geographical localization, the means modifying the safety floor compute a weighted interpolation function of the value of discontinuity on the basis of the values of the floor corresponding to the positions of geographical localization around the point of discontinuity and replace the value of discontinuity by the result of the interpolation function if this result is greater than the altitude of a detected obstacle.

BRIEF DESCRIPTION OF THE DRAWINGS

The invention as well as its advantages will be understood more clearly from the following description, made with reference to the appended figures, of which:

FIGS. 4a to 4c illustrate an example of values representing a safety floor during the performance of the algorithm of FIG. 2.

MORE DETAILED DESCRIPTION

Figure 1:
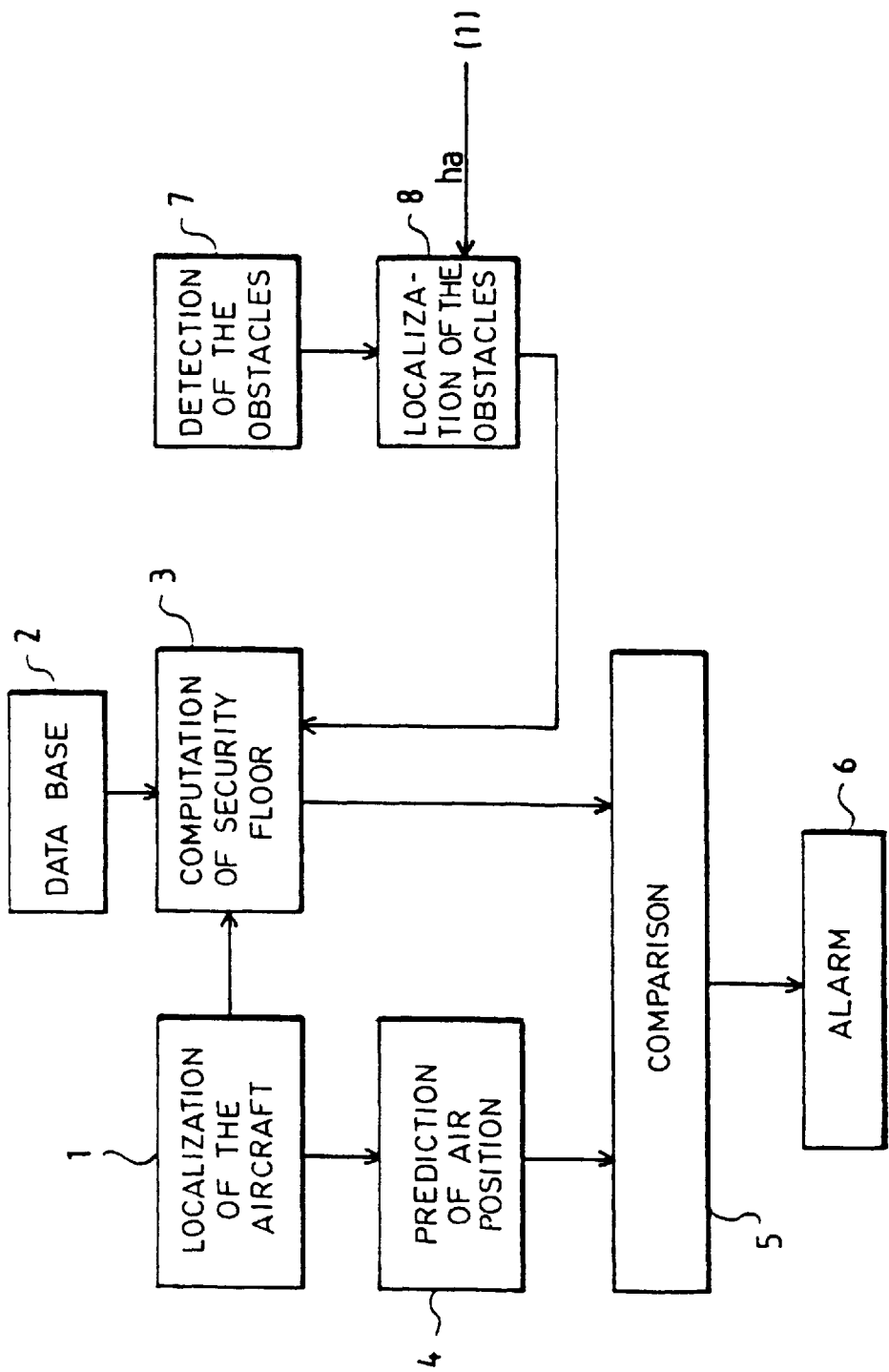
FIG. 1 gives an illustration, in the form of a block diagram, of a collision avoidance device according to the present invention.

FIG. 1 is a block diagram of a collision avoidance device according to the invention.

This device comprises at least means 1 for the localization of the aircraft that contains it and a database 2 memorizing especially a description of safety altitude. Means 1 for the localization of the aircraft comprise, for example, an inertial guidance system, a satellite-based localization/navigation unit and a flight management computer (these units are not shown). The unit also gives an altitude ha of the aircraft, with reference to a predetermined reference level $h_{ref}$, for example the mean sea level or a known geographical ellipsoid.

The safety altitudes of the data base 2 are, for example, defined with respect to the relief of the types of terrain that the aircraft may have to fly over, prohibited airspace zones or flight procedures or landing procedures. To this end, it contains for example a description of the navigation beacons for each airport as well as their geographical positions, a description of the approach procedures for each airport and a description of the minimum safety altitudes to be complied with when there is no airport in the vicinity or when the aircraft is at cruising speed.

Means 3, for example a computer, receiving information elements on geographical localization and safety altitudes then compute a safety floor beneath which the aircraft should not be located. Reference may be made notably to the document FR 2.697.796 for an example of a safety floor of this kind.

Prediction means 4 carry out an assessment, for a geographical place given by the means 1, of the air position of the aircraft, notably its vertical position between a first given instant $t_o$ which is for example that of the construction of the air floor 3 above the aircraft and a second given instant $t_o+\Delta t$. Here again, reference may be made to the document FR 2.697.796 for an example of the constitution of these prediction means. Between each floor construction, several predictions of positions of the aircraft may be made, especially from the known position of the aircraft at the instant to and its speed vector at this instant. Comparison means 5, connected to the means 3 and 4 and forming part, for example, of the computer then compare the predicted position of the aircraft with the constructed air floor.

If the position of the aircraft is above the air floor, it is deemed to be in safety. If not, a risk of collision is possible. In this case, an alarm 6, which may be a visual and/or sound alarm, may be triggered in order to carry out a collision avoidance operation.

According to the invention, the device furthermore has a sensor 7 enabling the detection, in a forward sector of the aircraft, of different obstacles of the relief and delivering measurements that enable means 8, also forming part for example of the same computer as above, to compute the altitude of these obstacles with respect to the predetermined reference level $h_{ref}$.

Figure 3:
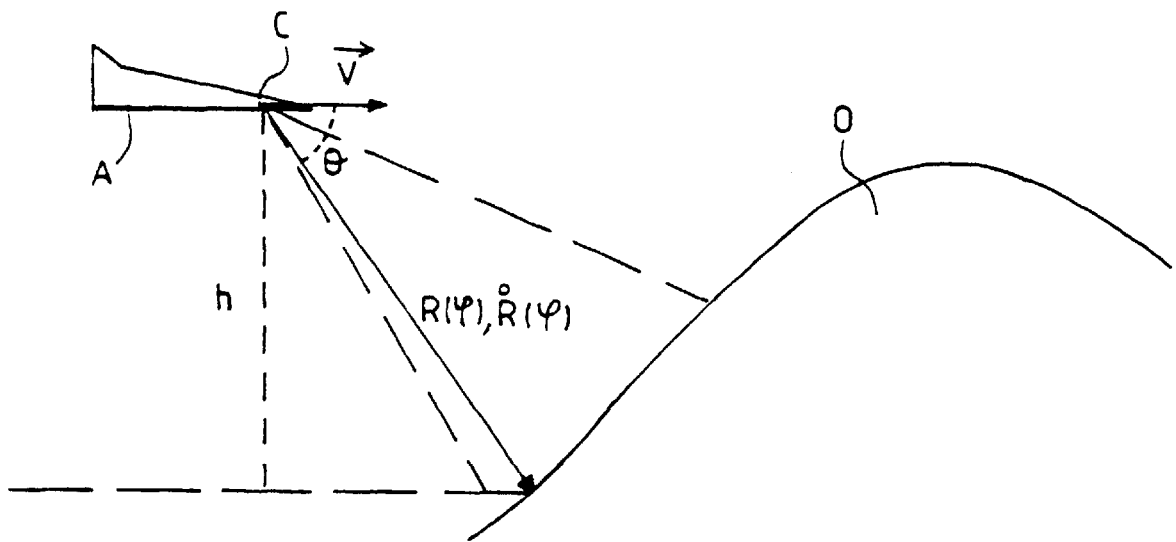
FIG. 3 shows a geographical position of the aircraft detecting an obstacle in its forward sector.

FIG. 3 shows an aircraft A moving at the speed $\vec{V}$ towards an obstacle 0 of the relief. The measurements given by the sensor C are constituted at least by the distance R from the sensor to an obstacle, the speed $\overset{\circ}{R}$ with which this obstacle is approached in relation to the aircraft and the azimuthal angular direction φ of the obstacle in relation to the horizontal, not seen in FIG. 3. With these three measurements being known, it is possible to determine the direction in elevation θ of the obstacle, which meets the relationship:

$\overset{\circ}{R}$=Vcos θcos φ

The relative height h with respect to the aircraft is deduced therefrom by computing the expression:

$$h = \frac{R}{\tan\theta}$$

Furthermore, with the altitude ha of the aircraft in relation to the reference level $h_{ref}$ being known, the altitude of the obstacle with respect to this same reference level is deduced therefrom.

The sensor used may be, for example, a meteorological radar or a lidar. Advantageously, it may carry out an azimuthal scanning of a forward sector of the aircraft that may possibly range, for example, from −60° to +60°.

Once the obstacles have been localized in terms of altitude, the data obtained will be capable, according to the invention, of bringing modifications, if need be, to the safety floor computed by the means 3 so as to consolidate this floor.

Figure 2:
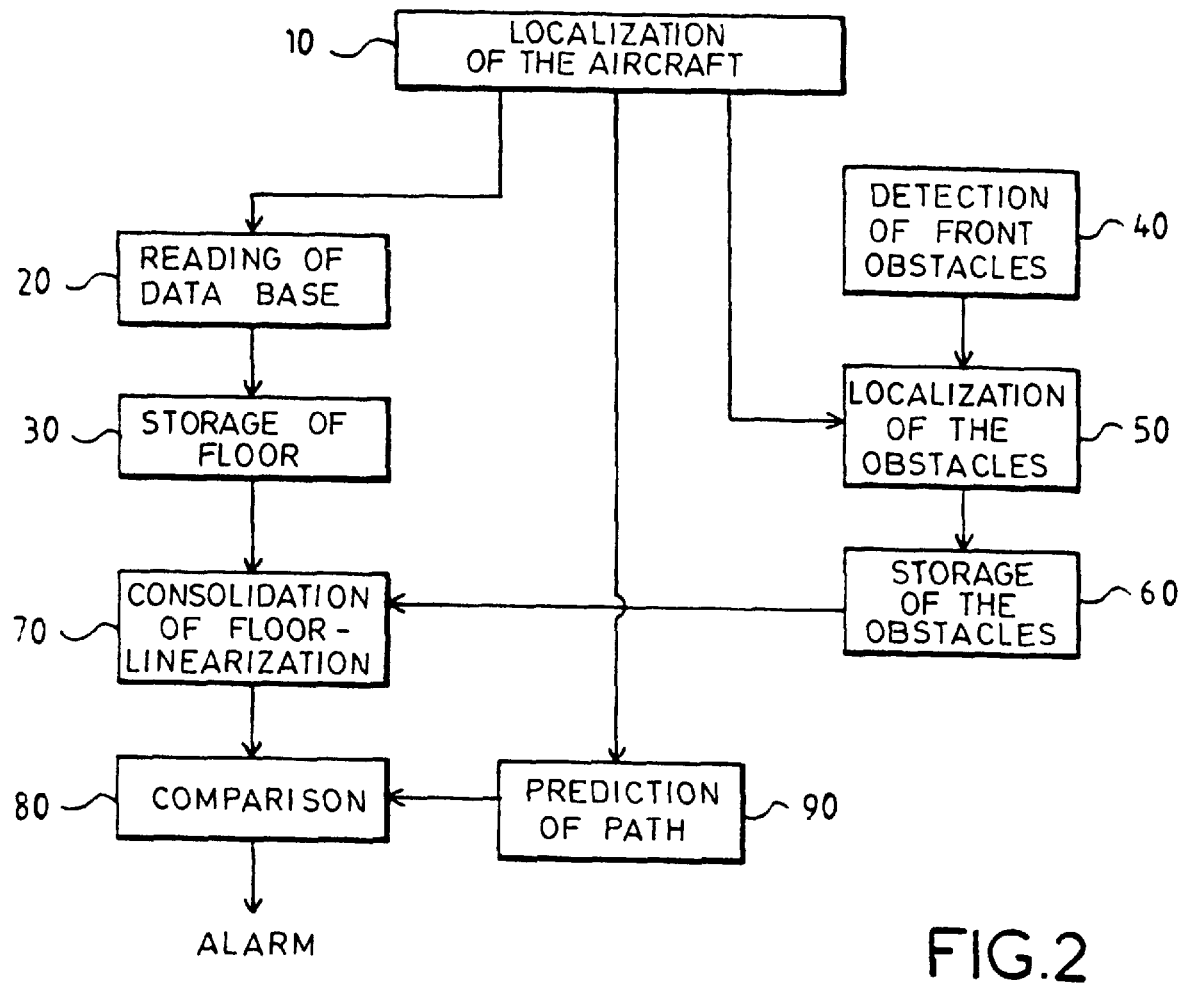
FIG. 2 illustrates the algorithm implemented by the device of FIG. 1.

Referring to FIG. 2 and to FIGS. 4a to 4c, an algorithm implemented by the device of FIG. 1 shall now be described.

The aircraft is first of all localized at 10 as a function of the position given by the navigation elements and then, at 20, a reading is made of the database so as to determine the safety floors. It is possible, for example, to achieve the storage at 30, in a memory M1, organized geographically in latitude and longitude, of the minimum height of the safety floors. FIG. 4a illustrates an example of the contents of the memory M1, with number 10 corresponding to an altitude of 1000 feet. In the refreshing of this memory M1, it is seen to it preferably that the data on the safety altitude around the aircraft is substantially at the center of the memory M1.

Furthermore, the sensor of the aircraft detects the obstacles in a forward sector of the aircraft at 40 and enables the computer to localize these obstacles in terms of altitude at 50. The computer keeps the cartography of the obstacles thus acquired with their corresponding altitude at 60 in a memory M2. This memory may, for example, be organized geographically in the same way as the memory M1. FIG. 4b illustrates an example of the contents of the memory M2, possibly increased by a safety margin. It can be seen that certain compartments of the memory may contain nothing if nothing has been detected at the corresponding geographical positions. The two memories M1 and M2 are thus constantly updated as a function of the progress of the aircraft and contain the information elements on the safety floors and obstacles before the aircraft.

The step 70 for the consolidation of the safety floor according to the invention is carried out as follows:

The computer makes a comparison between the information elements contained in the memory M1 and those contained in the memory M2. On the basis of the definition of the safety floors, any value contained in the memory M1 must be greater than the value of the memory M2 corresponding to the same geographical position. If this is truly the case, the value of the memory is M1 is preserved in a memory M3. This means that the value of the safety floor is validated for this geographical localization. If not, it is necessary to make a readjustment, according to the invention, of the value of the safety floor by placing, in the memory M3, not the value of the memory M1 but that of the memory M2, possibly increased by a safety margin. These operations amount, in fact, to replacing the value of the floor by the maximum of the values contained in the compartments of the memories M1 and M2, namely by the maximum between the value of the floor and the altitude of a detected obstacle, and to memorizing this maximum in a memory M3. FIG. 4c shows the contents of the memory M3 resulting from these operations performed on the basis of the memories M1 and M2 of FIGS. 4a and 4b, when the safety margin is taken to be equal to zero. Apart from certain compartments of the fourth and tenth columns, all the compartments truly contain the maximum between the value of the memory M1 and that of the memory M2.

The operation performed on particular compartments of certain columns forms part of a particularly useful variant of the device according to the invention:

It has been seen here above that the floors computed could have values of discontinuity or breaks for a given localization with respect to prior cases of localization generating harmful alarms. In the case of FIG. 4a, the memory M1 reports values of discontinuity in the first four compartments and the last three compartments of the fourth column, where the altitude goes from 1000 to 1500 feet and at the tenth column where the altitude goes from 1500 to 1000 feet.

At the time of the floor consolidation step 70, the invention also proposes the elimination, if possible, of these cases of discontinuity.

A possible algorithm is proposed here below to eliminate these cases of discontinuity:

The compartment of the memory M1 located at the intersection of the row i and the column j is referenced M1(i,j). The assumption is that M1(i,j) is greater than M2(i,j):

if $M1(i,j) \neq M1(i-1,j)$ or if $M1(i,j) \neq M1(i,j-1)$ then the following expression is computed:

$M'1(i,j)=F[M1(i-1,j-1), M1(i+1,j-1), M1(i-1,j+1), M1(i+1,j+1)]$ as a function of weighted interpolation of the value of discontinuity M1(i,j) on the basis of the values of the floor corresponding to the neighboring cases of geographical localization and where F is for example a bilinear function of the following type:

$F(x,y,z,w) = k_1 k_2 x + k_1(1 - k_2)y + (1 - k_1)k_2 z + (1 - k_1)(1 - k_2)w$ in which $k_1$ and $k_2$ are weighting coefficients.

If the quantity M'1 (i,j) obtained remains greater than M2(i,j), and lower than M1(i,j), then it is identified with M3(i,j):

M3(i,j) = M'1 (i,j)

Else, the initial value M1(i,j) is kept in the memory M3:

M3(i,j) = M1 (i,j)

The mathematical expression of M3(i,j) is therefore:

M3(i,j) = Sup(M2(i,j), Inf(M1(i,j), M'1(i,j)))

Let us take for example the compartment M1(2,4) in FIG. 4a.

We have:

M1(2,4) > M2(2,4)

Furthermore:

M1(1,3) = 10, M1(3,3) = 10, M1(1,5) = 15, and M1(3,5) = 15 and $k_1 = k_2 = \frac{1}{2}$ The following is therefore computed:

M'1(2,4)=12.5

This value is even greater than M2(2,4). It is therefore memorized in the memory M3 (see FIG. 4c). In FIG. 4c, it can be seen that certain compartments have crosses. Their value cannot be known at the current instant for all the neighboring points are not available. Furthermore, for certain compartments, a value M'1(i,j) greater than the initial value M1(i,j) is found. This is the case, for example, with the points M3(5,3), M3(5,4), M7(5,3) and M7(5,4). The initial value M1(i,j) is then kept in the memory M3.

Other examples of interpolation functions taking account of a variably large number of floor values corresponding to previous cases of geographical localization may of course be applied without departing from the framework of the present invention.

Figure 5:
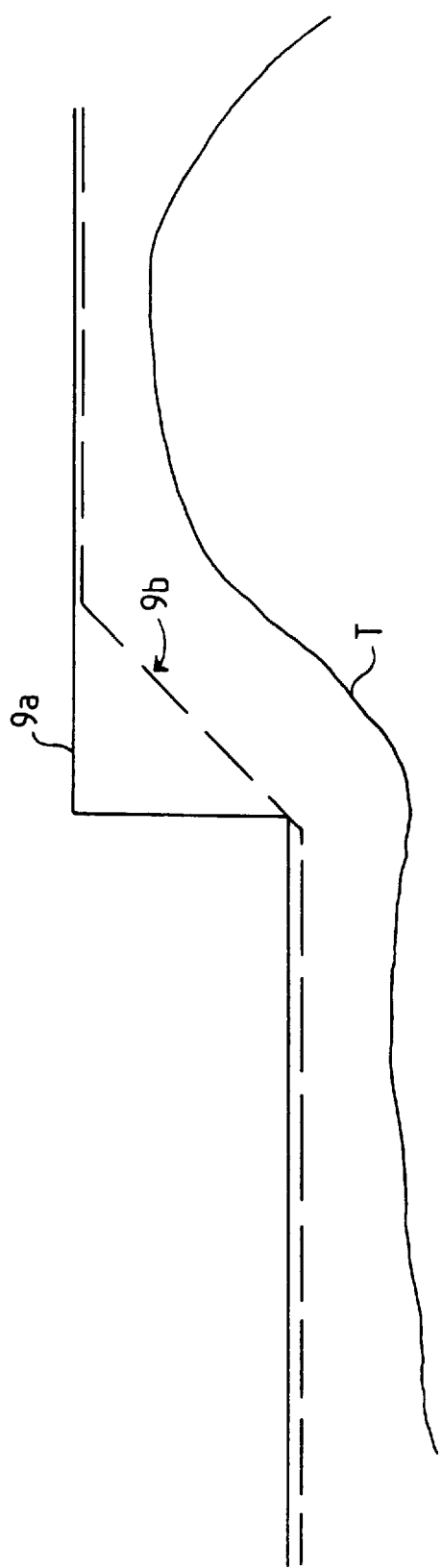
FIG. 5 illustrates an example of a safety floor with a value of discontinuity and a safety floor made continuous according to the invention.

FIG. 5 gives a view, in an unbroken line, of an exemplary safety floor 9a that may be delivered by the computation means 3 for flight over a ground T before passage into the discontinuity eliminating algorithm. It also gives a view, in a line of dashes, of the safety floor 9b obtained after the elimination of the cases of discontinuity.

Once the safety floor has been consolidated and, possibly, made continuous, it is, as can be seen in FIG. 2, compared at 80 with the predicted situation at 90 of the aircraft in order to trigger the alarm if necessary.

The improvements provided by the present device according to the invention as compared with the device of the document FR 2.697.796 consequently make it possible not only to annihilate the risk of belated alarms related to navigation measurement errors but also, in its preferred variant, to reduce the rate of harmful alarms or the duration of the alarms once the obstacle avoidance maneuver has been begun. It does so by making the safety floors continuous.

What is claimed is:

1. A collision avoidance device for an aircraft, said device comprising means for locating a geographical position of the aircraft; means for computing and storing a respective safety floor above which the aircraft should be positioned for each respective geographical zone among a number of geographical zones around said geographical position of the aircraft;

a sensor mounted on the aircraft for detecting obstacles in a forward sector of the aircraft and for providing information relative to a position of a detected obstacle with respect to the aircraft;

means for measuring an altitude of the aircraft with respect to a reference level;

means for computing a geographical position of the detected obstacle and an altitude of said detected obstacle with respect to the reference level, said computing means being connected to said sensor, to said measuring means and to said locating means;

means for determining a new safety floor, by keeping or modifying the stored safety floor corresponding to the geographical position of the detected obstacle, depending on said altitude of said detected obstacle;

means for predicting geographical positions and altitudes of the aircraft at futures instants; and means for comparing the predicted altitude of the aircraft at each of said future instants with the new safety floor corresponding to the predicted geographical position of the aircraft at said each future instant.

2. A collision avoidance device according to claim 1, wherein said sensor delivers at least a distance R separating the aircraft from the detected obstacle, an azimuthal angular direction, with respect to the horizontal, of said detected obstacle and an angular direction in elevation of the said detected obstacle and wherein the altitude of said detected obstacle is determined by computing firstly a relative height with respect to the aircraft using the distance R and the angular direction in elevation and by deducing the altitude of the obstacle from the relative height and the measured altitude of the aircraft.

3. A collision avoidance device according to claim 1, wherein said sensor delivers at least a distance R, a speed $\mathring{R}$ with which the detected obstacle is approached and an azimuthal angular direction $\phi$, with respect to the horizontal, of said detected obstacle and wherein the altitude of said detected obstacle is determined by computing firstly a relative height with respect to the aircraft and by deducing the altitude of the obstacle form the relative height and the measured altitude of the aircraft and wherein the relative height is an expression of the distance R and an angular direction in elevation of the said detected obstacle.

4. A collision avoidance device according to claim 3, wherein said locating means delivers a speed vector $\vec{V}$ of the aircraft and wherein said angular direction in elevation is an expression of said speed $\mathring{R}$, said azimuthal angular direction of the detected obstacle and said speed vector of the aircraft.

5. A collision avoidance device according to claim 1, wherein the new safety floor is determined by the replacement, for each geographical zone, of the value of the stored safety floor by the maximum between the value of the stored safety floor and the altitude of a detected obstacle increased by a safety margin.

6. A collision avoidance device according to claim 1 wherein if the computed safety floor has a value of discontinuity for a given geographical zone with respect to surrounding geographical zones then the means determining the new safety floor compute a weighted interpolation function of the value of discontinuity on the basis of the values of the safety floor corresponding to the surrounding geographical zones and replace the value of discontinuity with the result of the interpolation function if this result is greater than the altitude of a detected obstacle in said given geographical zone increased by a safety margin.

7. A collision avoidance device according to claim 6, wherein the interpolation function is a bilinear function.

8. A collision avoidance device according to claim 1, wherein the sensor is a meteorological radar.

9. A collision avoidance device according to claim 1, wherein the sensor is a lidar.

10. A collision avoidance device according to claim 1, wherein the sensor carries out an azimuthal scanning of the forward sector of the aircraft.

* * * * *